April 29, 1958    A. A. ESPARI ET AL    2,832,122
CLAMPING DEVICES FOR ROD-SAWING MACHINES
Filed March 5, 1954    3 Sheets-Sheet 1

INVENTORS
A. A. Espari
L. J. Paffumi
BY Rockwell & Barthelow
ATTORNEYS

United States Patent Office 2,832,122
Patented Apr. 29, 1958

2,832,122

CLAMPING DEVICES FOR ROD-SAWING MACHINES

Alphonse A. Espari, Hamden, and Louis J. Paffumi, New Haven, Conn., assignors, by mesne assignments, to The H. P. Townsend Manufacturing Co., Elmwood, Conn., a corporation of Connecticut Application March 5, 1954, Serial No. 414,238

1 Claim. (Cl. 24—263)

This invention relates to clamping devices used in connection with rod-sawing machines and similar machines and it has particular reference to clamps adapted to hold one or more rods in a clamping jaw or body through the use of a clamping screw operated by an electric motor for clamping and releasing the work.

In connection with rod-sawing machines, for example, trucks are used to carry work along a track toward the point where the sawing operation is to take place and one or more of the trucks that move along rails are usually provided with a clamp which grips the rod or rods and holds the same in fixed position on the truck. In clamping and releasing the rod, difficulty often arises owing to the fact that the screw spindle of the clamp gets stuck or jammed, there being insufficient power to overcome this condition.

One of the objects of the present invention, therefore, is to overcome this drawback and provide a motorized clamp of a structure such that the screw spindle can be turned even when very considerable resistance is offered to its rotation.

Another object of the invention is to provide a clamping device having a lower clamp body or jaw and an upper head carrying a vertically movable screw clamp, the screw being turnable by an electric motor and the clamp structure being such as to inhibit sticking of the screw even under very adverse conditions.

Another object is to provide a clamp having a motorized head which overhangs the clamping body or jaw, said head being readily swingable to and from a position in which it overhangs the clamp body.

Figure 1:
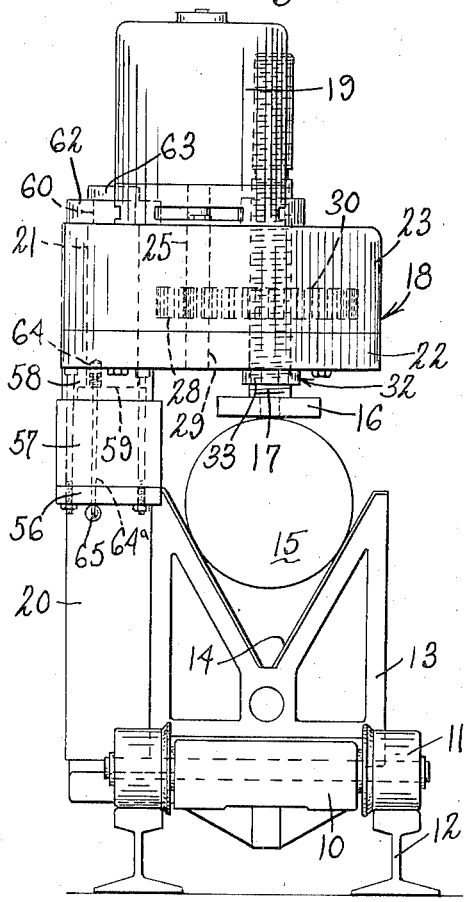
Fig. 1 is an elevation of a rail-guided truck or car equipped with a clamp embodying the present invention.
Figure 2:
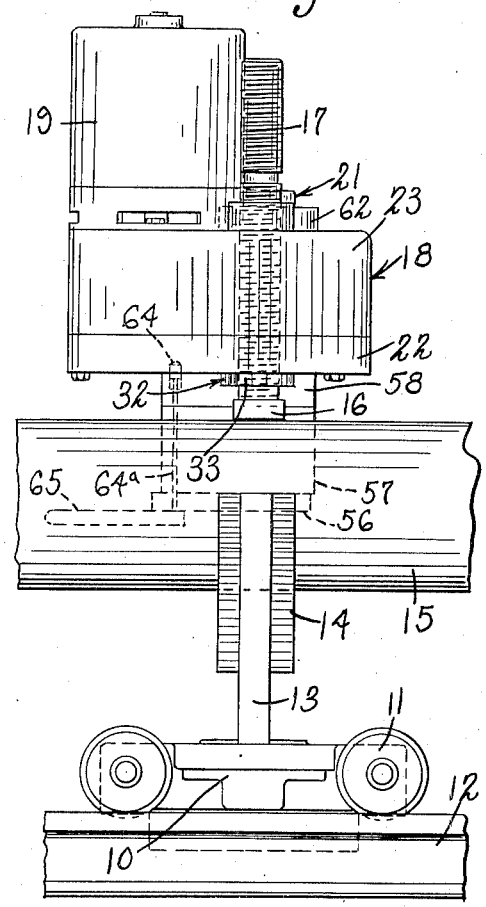
Fig. 2 is a side elevation of the truck looking from the right-hand side of Fig. 1.

In the form of the invention illustrated in the drawings, the improved clamp is provided upon a rail-guided truck such as used for advancing the work toward a rod-sawing machine. The clamp illustrated is one employed for clamping a single large rod, but it may be employed for clamping a number of rods in a clamp body. The clamp body is a member provided with a V-shaped recess facing upwardly and the clamping member is in the form of a clamping plate attached to the lower end of a screw spindle and movable downwardly to clamp the rod in the clamping jaw or body. The screw spindle depends from a gearing-equipped casing on top of which is an electric motor which rotates the screw through the gearing in the desired direction, the motor being a reversible torque motor. The casing is mounted on a support at one side of the clamp body and this casing can be swung horizontally to and from a position in which it overhangs the recess in which the workpiece is clamped. For permitting this operation, the motor-equipped casing is arranged for swiveling on a vertical axis disposed at one side of the clamp, as hereinafter described.

In the drawings, the truck referred to is indicated at 10, the truck wheels at 11, the guide rails for the truck at 12, the clamp body mounted on the truck at 13, the V-shaped recess of the body at 14, the rod to be clamped at 15, the clamping plate or member at 16, the screw spindle at 17, the casing at 18, the electric motor supported on top of the casing at 19, the member at one side of the clamp on which the casing 18 is mounted at 20, and the member providing a swiveling axis for the casing at 21.

Figure 4:
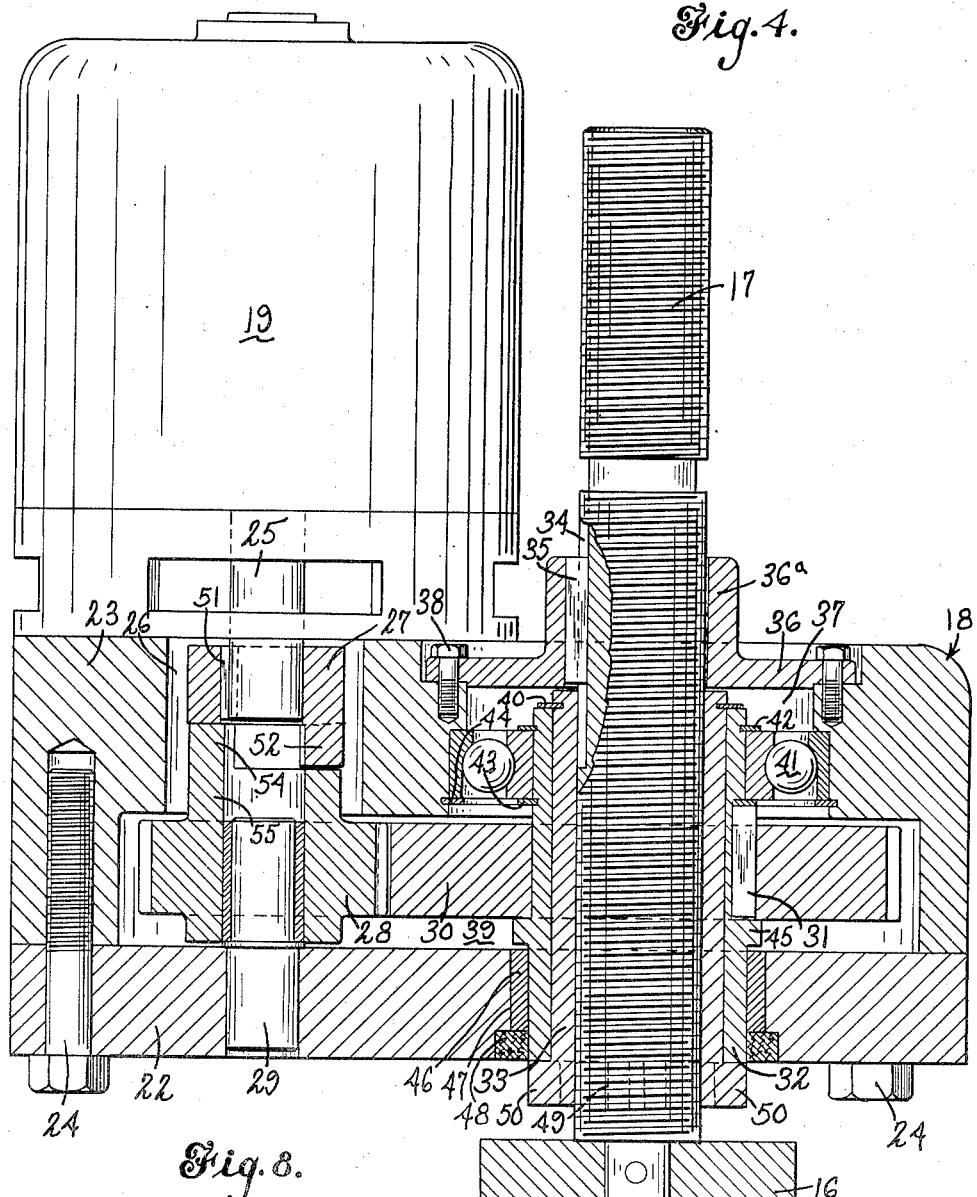
Fig. 4 is a section on line 4—4 of Fig. 3.

The clamp body 13 is rigidly supported on the truck 10 between the ends of the latter and is in a plane transverse to the truck, the clamp recess being shaped so as to make contact with the workpiece in the manner shown by way of example in Fig. 1. The clamping plate 16 may be of appropriate kind and it is attached in any suitable manner to the lower end of the screw spindle 17. This screw spindle extends through the casing 18 in a vertical direction, the clamping plate being located below the casing and the upper end portion of the spindle being above the casing. This casing is made up of two main parts, namely, a base plate 22 and a casing member 23, these two members being interconnected by means such as screws 24 (Fig. 4). The casing member 23, as shown in Fig. 4, is cut away and bored to provide for mounting therein the screw spindle and other parts which will now be described.

Figure 3:
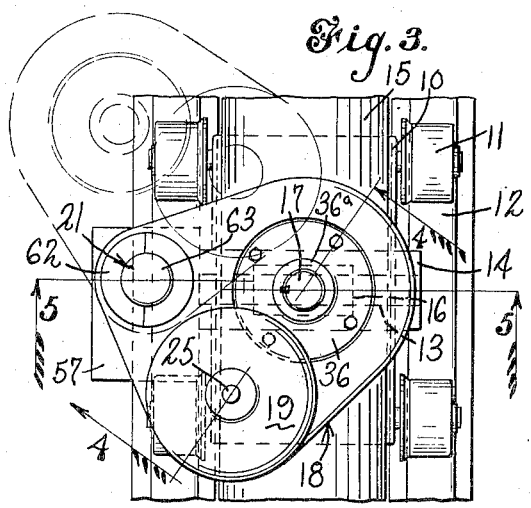
Fig. 3 is a top plan view of the truck.

The electric motor 19 is one having a vertical shaft 25 projecting downwardly therefrom and this motor is placed on top of the casing 18 in the relationship shown in Fig. 3, which view shows the shape of the casing in plan. From Fig. 3, it will be apparent that the swiveling axis 21, the screw spindle 17 and the motor shaft 25 are at the apices of a triangle.

The lower extremity of the motor shaft 25 extends into a bore 26 in the casing and is keyed to a driving member 27. This driving member 27 is arranged to engage and drive a pinion 28 in the casing above the bed plate 22, pinion 28 being rotatably mounted on a pin 29 socketed in the base plate as shown in Fig. 4. The pinion 28 meshes with a gear wheel 30 disposed in a chamber in the casing and surrounding the screw spindle 17. The gear wheel 30 is keyed at 31 to an outer sleeve member 32 surrounding the screw spindle and this outer sleeve 32 through mechanism fully described hereinafter, drives a concentric inner sleeve 33, which inner sleeve is internally threaded to engage the threads of the screw spindle and provides a rotary nut by means of which the screw spindle can be raised and lowered. The screw spindle is guided vertically in the casing so as to be held against rotation and for this purpose the screw spindle has a longitudinal keyway 34 engaging a key 35 held in position in a plate 36, as shown in Fig. 4.

The plate 36 is a guide plate for the screw spindle and has an upwardly extending sleeve 36ª surrounding the spindle and this plate serves as a cover for a wide bore 37 in the body of the casing, the plate being held in position by suitable means such as screws 38. The bore 37 communicates with a chamber 39 in which the above-described gear members are contained. The inner sleeve member 33 extends upwardly to a point such that its upper end is in close proximity to the plate 36. The upper extremity of the outer sleeve member 32 is slightly below the extremity of the inner sleeve member and a snap ring 40 carried by the inner sleeve overlies the top of the outer sleeve. A ball-bearing 41 extends about the upper portion of the outer sleeve and is maintained in relationship to this sleeve by upper and lower snap rings 42 and 43 which overlie the bearing and are set in grooves in the outer sleeve. The bearing 41 is supported against an upper shoulder in the casing and a snap ring 44 holds it seated in the casing and thereby assists in positioning the sleeve members vertically with respect to the casing.

The gear wheel 30 and the associated sleeve members are supported relatively to the casing by a collar 45 integral with and extending laterally from the outer sleeve member and disposed over the upper end of a bushing 46 located in an opening 47 in the base plate 22. Associated with the lower end of the bushing and the lower end of the outer sleeve is a packing gland 48 which prevents the escape of lubricant from the chamber within the casing.

The inner sleeve or nut 33 is adapted to be rotated by percussion action imparted to it from the outer sleeve 32 and for this purpose the lower ends of the sleeve members are equipped with cooperating percussive or hammer blow members. Both sleeves are extended downwardly to a slight extent beyond the base plate and the cooperating percussive members are provided upon these downward extensions. In the form shown, the percussive members are constituted by integral lugs provided upon the sleeves, the outer sleeve being provided at diametrically opposite points with downwardly extending arcuate lugs 49 that are provided on the body of the sleeve, and the inner sleeve being provided with radially outwardly projecting lugs 50 integral therewith that are located at diametrically opposite points. The arrangement is such that, when the outer sleeve is rotated in either direction, one of the lugs 49 may strike against one of the lugs 50 for rotating the inner or nut sleeve while the other lug 49 will cooperate similarly with the other lug 50.

Reverting now to the structure of the pinion 28 and the driving member 27 for this pinion, it is to be noted that member 27 is keyed to motor shaft 25 by a key 51 (Fig. 4) and that at one point in its circumference the driving member or sleeve 27 has integral therewith a depending lug 52, the sides of which are disposed on radial lines and are adapted to engage the sides 53 of a similar lug 54 integral with the hub portion 55 of pinion 28 and extending upwardly from said hub. The lugs 52 and 54 being in the same horizontal plane, rotation of the driving sleeve in either direction will cause this lug to exert a hammer-like blow against the cooperating lug so as to rotate the pinion by percussive action.

Figure 5:
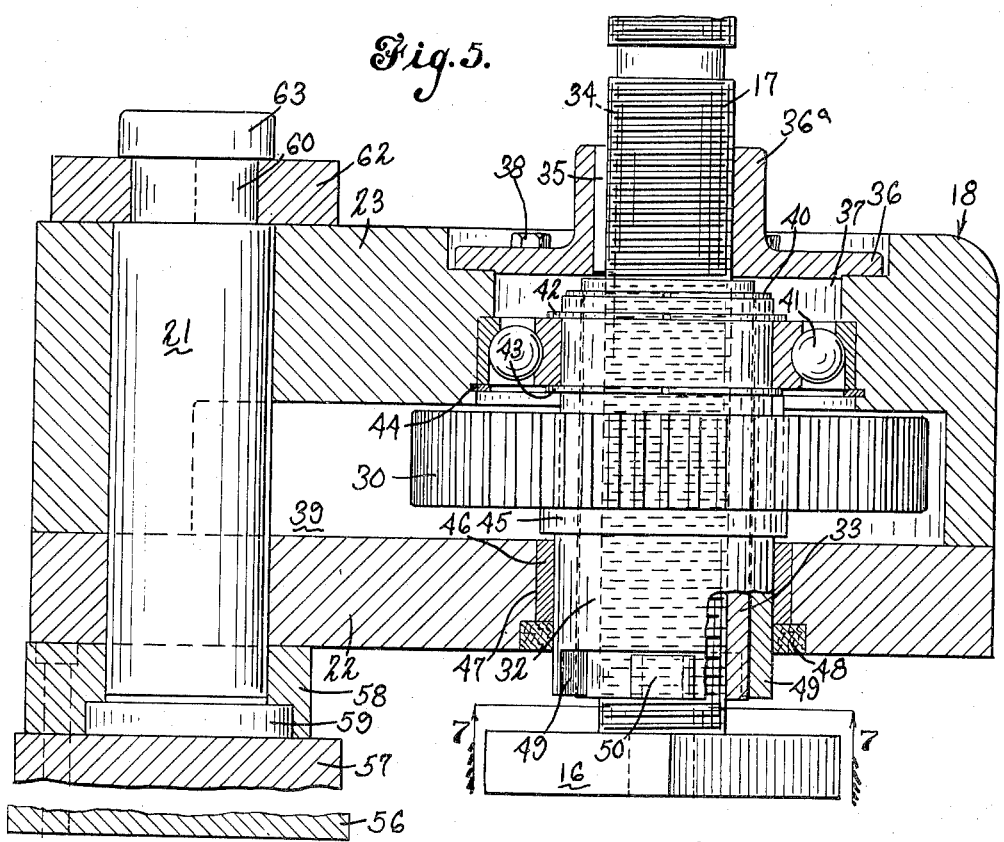
Fig. 5 is a section on line 5—5 of Fig. 3, a part of the structure being broken away.
Figure 6:
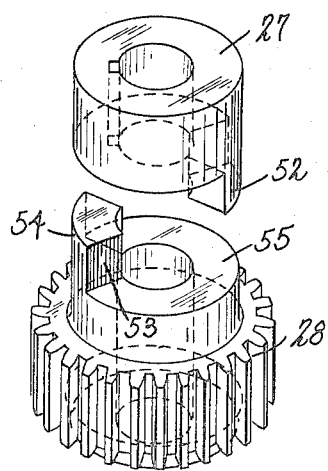
Fig. 6 is a detail perspective view showing the driving pinion and the member for rotating it.
Figure 7:
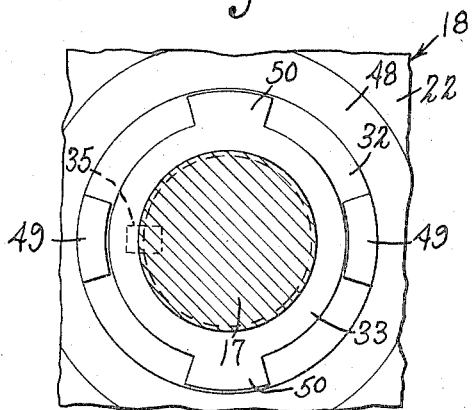
Fig. 7 is a section on line 7—7 of Fig. 5.

Reverting now to the manner of mounting casing 18 on the mounting member 20, it will be noted that the member 20 is an upright bar-like member rigidly mounted at one side of the clamp body 13, this member serving as a pedestal for the casing 18. Rigid with the member 20, at the upper end of the latter, is a bracket 56 on which is mounted a spacer block 57, said spacer block being spaced downwardly to some extent from the base plate 22. Between the spacer block 57 and the base plate 22, a spacing member 58 is interposed, and suitable bolts, such as those shown by broken lines in Fig. 1, serve to secure the parts 57 and 58 on the bracket 56. The member 21, which provides the swiveling axis for the casing, is in the form of an upright pin resting at its lower end on the spacing block 57 and extending upwardly through the part 58 and through the casing in a manner to provide a swiveling axis on which the casing can turn. At the lower end, the member 21 has an enlarged base 59 received in the bore through the member 58 and at the upper end of the pin a neck 60 provided thereon is accommodated in a split collar 62 resting on top of the casing, the upper extremity of the pin being provided with a head 63 overlying the collar. The pivoting or swiveling pin is rigid and, as shown in Fig. 5, is provided with a cylindrical body serving as a support for the horizontally swingable casing. The casing swings on the smooth upper surface of the member 58.

It will be understood that, when the clamp is in the operative position, the casing and the clamping plate will overhang the body portion of the clamp, as shown in Fig. 1. However, for permitting the workpiece to be lowered into the clamp body by a crane, or the like, the casing of the screw is swung to one side. When the clamp is in the operative position, the casing is locked in place by suitable means, such as a vertically slidable laterally stationary detent 64 which is adapted to engage socket means in the base portion of the casing 18 and, in the form shown, this detent has a member 64ª extending through the spacer block which may be moved to releasing position by manipulation of a handle member 65 accessible at the under part of the bracket 56.

It is believed that the operation of the device will be clear from the above description. The electric motor employed is preferably a reversible torque motor by means of which the nut 33 can be rotated in opposite directions to raise and lower the clamping plate. The driving member carried by the motor shaft operates the gearing in the manner above described to rotate the nut. In case the nut has a tendency to stick or jam, the percussive members between the motor shaft and the nut will be of great assistance in freeing the clamp for the purpose of releasing the clamping plate from the workpiece. Obviously, the reversibility of the motor is of importance because if in the jammed position two cooperating percussive lugs are in engagement with each other, the reversing of the motor permits them to be disengaged through a substantial distance so that when the motor is again reversed, an effective blow is given to the member which it is desired to rotate. Owing to the fact that a pair of percussive cooperating members is provided in more than one location, the utility of the tool in overcoming resistance is increased, especially because, at least usually, the blows imparted in two locations are not imparted at the same instant. Also it is to be noted that the driving lug associated with the motor shaft is driven at a considerably higher speed than the one associated with the spindle nut. In releasing the workpiece, the lost-motion provided in connection with the pinion 28 enables the motor to pick up speed before it encounters the resistance offered by the nut and its associated parts. Then the described connection between the actuating sleeve and the nut comes into play to move the nut effectively.

Figure 8:
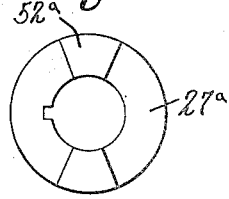
Fig. 8 is a somewhat diagrammatic view showing a modified form of pinion-driving member.

In the modified form shown in Fig. 8, the driving member 27ª, which is operated from the motor shaft, is equipped with two lugs 52ª which are located at opposite points, and, in connection with such a driving member, a driving pinion having diametrically located lugs would be used.

The improved clamp herein described is very effective in operation, enabling the workpieces to be more readily clamped and released than in prior devices of which we are aware. Moreover, the structure is relatively simple and inexpensive.

Various modifications and changes in the details may be made without departing from the principles of the invention or the scope of the claim.

What we claim is:

In a clamping device such as described, a rectilinearly movable nonrotative clamp spindle having external screw threads formed thereon and having at one end a jaw member fixed thereto for clamping a workpiece against another jaw member, an electric motor having a shaft parallel to the spindle, a casing enclosing a portion of the spindle, a rotary sleeve-like nut in the casing for moving the spindle toward and away from the workpiece, a rotary actuating sleeve in the casing surrounding said nut, and means in the casing for turning said actuating sleeve by rotation of the motor shaft including a pinion in line with the motor shaft and a gear meshing with said pinion and mounted on the actuating sleeve in rigid and embracing relation thereto, the actuating sleeve having percussive lugs formed thereon cooperating with lugs formed on the nut, said means also comprising a driving member on said motor shaft having a percussive lug cooperating with a corresponding lug on said pinion to exert a percussive effect on the latter so that the nut may be started to effect release of the workpiece by the jaw member carried by the clamp spindle.

References Cited in the file of this patent

UNITED STATES PATENTS

| | | |
|---|---|---|
| 480,810 | Downie | Aug. 16, 1892 |
| 703,830 | Rendle | July 1, 1902 |
| 1,413,305 | Webb | Apr. 18, 1922 |
| 1,885,855 | Moran | Nov. 1, 1932 |
| 1,967,507 | Hibbard | July 24, 1934 |
| 2,005,891 | Elberty | June 25, 1935 |
| 2,325,026 | Anway | July 27, 1943 |
| 2,483,713 | Seaver | Oct. 4, 1949 |
| 2,583,147 | Kaplan | Jan. 22, 1952 |
| 2,759,385 | Franck | Aug. 21, 1956 |

FOREIGN PATENTS

| | | |
|---|---|---|
| 709,105 | Germany | Aug. 6, 1941 |